United States Patent
Naville et al.

(10) Patent No.: US 6,332,507 B1
(45) Date of Patent: Dec. 25, 2001

(54) SEISMIC PROSPECTING METHOD AND DEVICE IN WELLS ALLOWING GUIDED WAVES FILTERING

(75) Inventors: Charles Naville, Grigny; Yves Ollivier, Lardy; Jean Laurent, Orgeval; Guy Pignard, Rueil-Malmaison, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 08/365,687

(22) Filed: Dec. 29, 1994

(30) Foreign Application Priority Data

Dec. 29, 1993 (FR) .................................................. 93 15815

(51) Int. Cl.$^7$ ........................................................ G01V 1/40
(52) U.S. Cl. .................................. 181/102; 367/25; 367/57
(58) Field of Search ..................................... 181/101, 102, 181/106; 367/57, 25; 175/1; 102/312, 313, 332, 333

(56) References Cited

U.S. PATENT DOCUMENTS

| | | | |
|---|---|---|---|
| 4,578,785 | * 3/1986 | Gelfand | 367/35 |
| 4,651,311 | 3/1987 | Owen et al. | 367/119 |
| 4,817,755 | * 4/1989 | Gildas | 181/106 |
| 4,849,945 | * 7/1989 | Widrow | 367/30 |
| 4,858,718 | * 8/1989 | Chelminski | 181/106 |
| 4,873,675 | * 10/1989 | Barr, Jr. et al. | 367/57 |
| 5,170,018 | * 12/1992 | Potier | 181/101 |
| 5,171,943 | * 12/1992 | Balogh et al. | 181/102 |
| 5,185,503 | * 2/1993 | Fortin | 181/102 |

* cited by examiner

*Primary Examiner*—Ian J. Lobo
(74) *Attorney, Agent, or Firm*—Antonelli, Terry, Stout & Kraus, LLP

(57) ABSTRACT

A VSP or reversed VSP type seismic prospecting method according to the invention allows disturbances contained in seismic recordings produced by tube waves propagating along wells and refracted in zones close to the surface to be minimized. The method disperses a gas under pressure, having preferably a high compressibility, capable of absorbing these tube waves. The gas may be generated by an explosive chemical reaction set off in situ, at a certain depth of the well (which may constitute the seismic wave source). The method has an application for seismic prospecting or drilling noise monitoring.

11 Claims, 4 Drawing Sheets

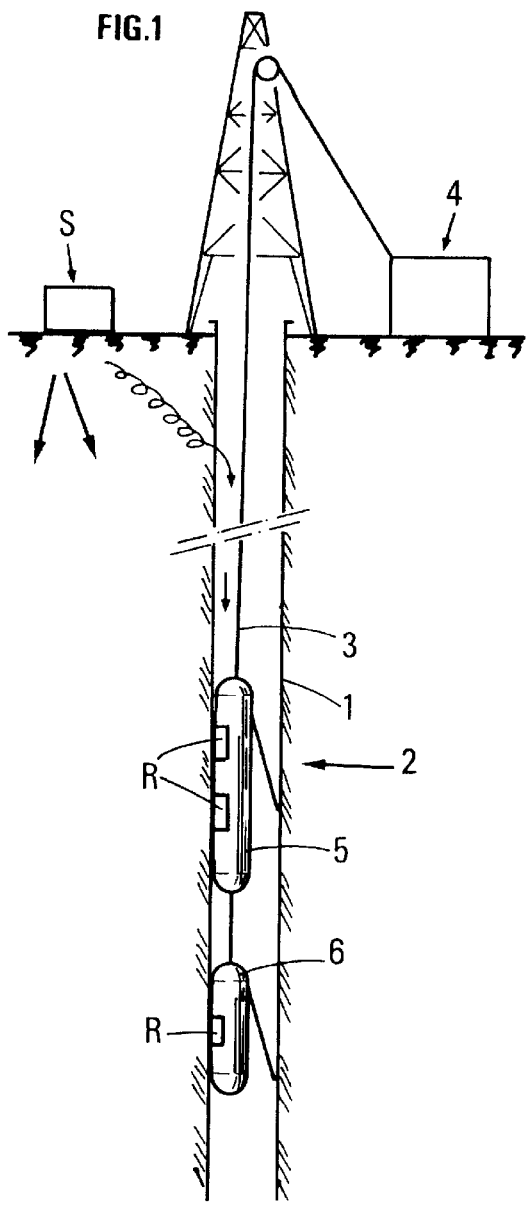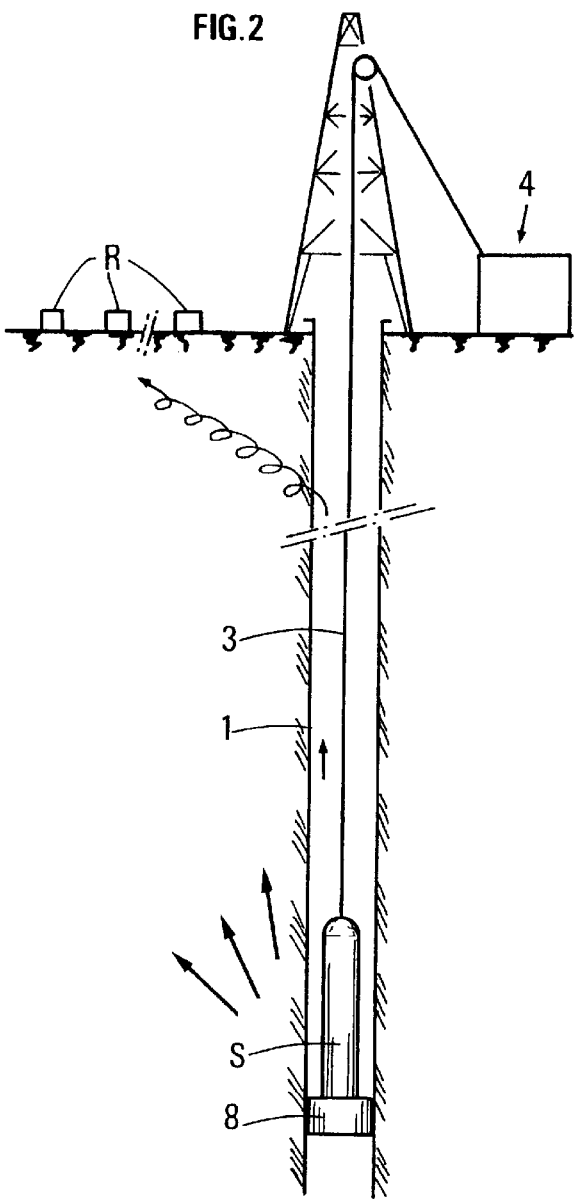

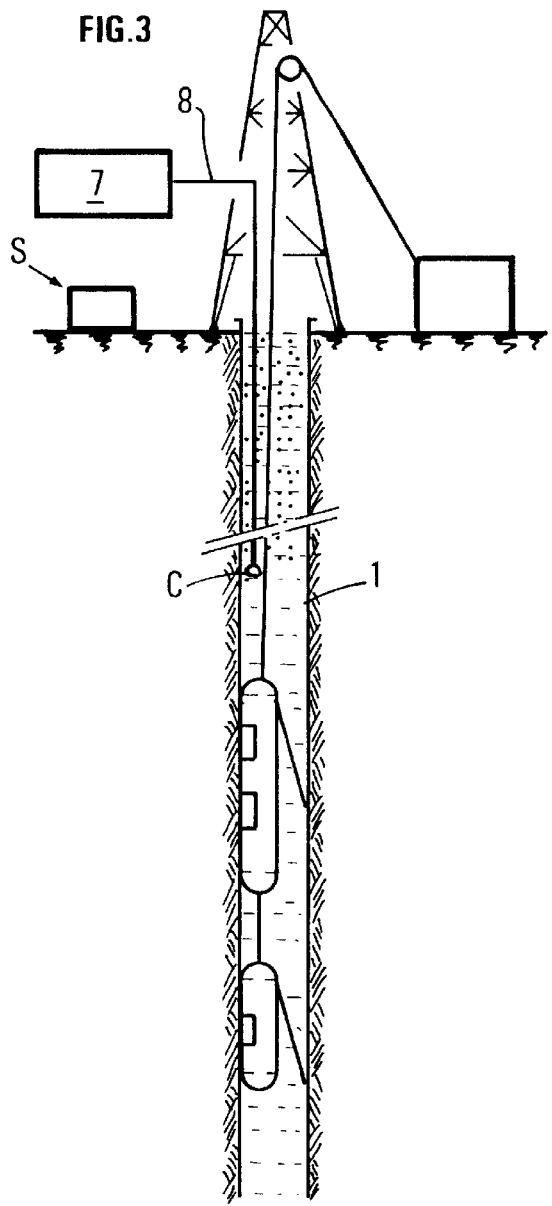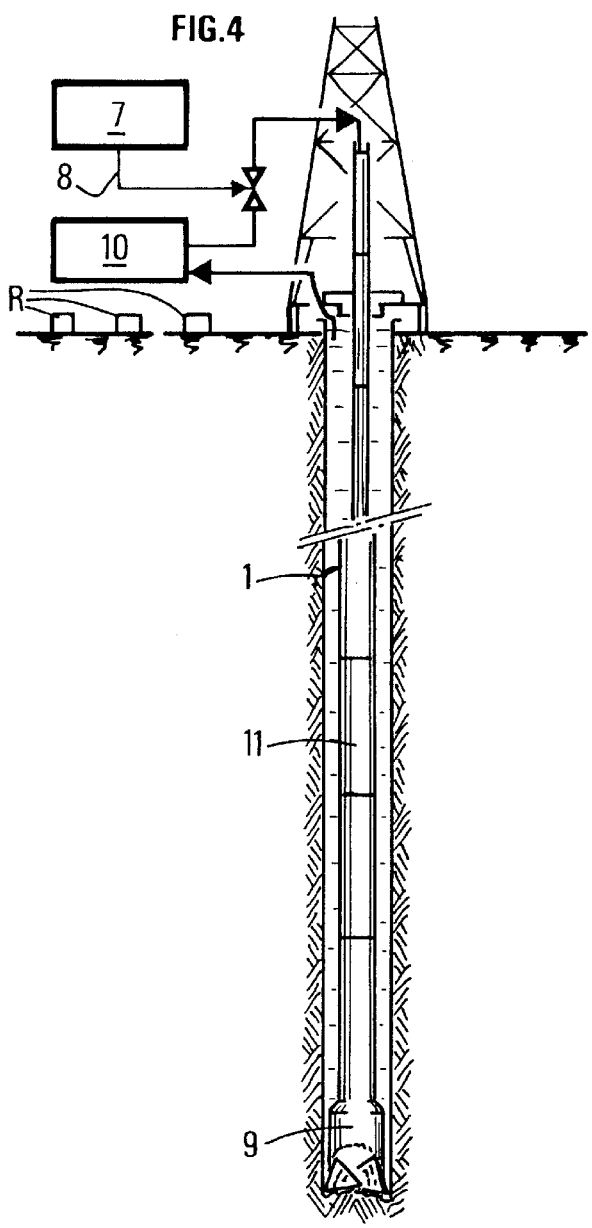

SEISMIC PROSPECTING METHOD AND DEVICE IN WELLS ALLOWING GUIDED WAVES FILTERING

FIELD OF THE INVENTION

1. Background of the Invention

The present invention relates to a method and to a device for performing prospecting operations in a well, allowing filtering of certain undesirable waves likely to be propagated in a subsurface formation from a source of elastic waves, whether, induced or not, to pickups coupled with the formations crossed by these wells.

2. Description of the Prior Art

The prospecting method according to the invention is for example applicable to the VSP type (vertical seismic prospecting) or of the RVSP type (reversed vertical seismic prospecting). In the first case, it may be implemented by means of an emission-reception assembly including seismic pickups (geophones or hydrophones) placed in a well and a source of elastic waves arranged at the surface. In the second case, the assembly includes a source placed in a well and seismic pickups arranged either at the surface or in another well. The method according to the invention may also be implemented in a well by means of sonic sondes.

The method and the device according to the invention is, for example, applicable to seismic operations where the noises emitted by a drill bit at work at the bottom of a well are recorded (drilling noise monitoring).

It is well-known that wave conversions occur in the upper part of a well crossing the zone called the weathered layer. The ground vibrations generated by a source at the surface are converted into waves referred to as tube waves, which are guided along the well to the pickups arranged at a given depth when a VSP type method is implemented.

It is the same for the reversed configuration (RVSP), where the waves generated by a source arranged in a well are guided along the well towards the weathered layer and converted into surface waves which disturb the signals received by the pickups arranged at the surface.

SUMMARY OF THE INVENTION

The method according to the invention allows significant reduction of the waves referred to as tube waves propagating along a well containing a liquid which are responsible for parasitic signals picked up by seismic receivers coupled with a subsurface formation crossed by the well, in response to waves applied to the ground.

The invention performing prospecting operations while a gas substantially insoluble in said liquid and compressible enough to absorb at least part of the energy conveyed by the tube waves towards the seismic receivers has been dispersed in the liquid in the upper part of the well, for example by setting off a chemical reaction, or an explosion.

The dispersion in the well of a gas likely to absorb at least part of the energy conveyed by the tube waves may also be achieved, for example, while the well is drilled by a drill bit associated with a drill string, by injecting the gas in a drilling fluid circulation feeding the bit. The elastic waves may be emitted by the drill bit working at the well bottom or by a source of waves distinct from the bit, which is actuated for example after the bit has been removed. The injected gas flowing up through the annular space between the well and the string absorbs the tube waves in this case.

Seismic operations may be performed with emission and reception devices arranged in at least one well sonde.

The device according to the invention includes for example a source producing elastic waves, receivers coupled with the formations and a source such as an explosive charge, to create in situ, at a determined depth of the well, a chemical reaction generating the absorbent gas. This charge may constitute the source of elastic waves.

According to another embodiment, the device includes a device for injecting gas under pressure in a drilling fluid circulation established during the drilling of a well by a drill bit, and a source which may be the drill bit itself or which may be distinct therefrom, and actuated for example after the drill bit has been removed to produce elastic waves.

The method according to the invention has been proven to be highly effective. It has been established that the attenuation factor on seismic records of disturbances caused by the conversion of the guided waves obtained by this gas dispersion ranges for example between 8 and 20.

BRIEF DESCRIPTION OF THE DRAWINGS

Other features and advantages of the method and of the device according to the invention will be clear from reading the description hereafter of embodiments given by way of non limitative examples, with reference to the accompanying drawings in which :

FIG. 1 diagrammatically shows a seismic assembly suited for a VSP type method;

FIG. 2 diagrammatically shows an assembly for carrying out a RVSP type method;

FIG. 3 diagrammatically shows a seismic installation for implementing a VSP type seismic method, associated with an assembly allowing dispersion of a gas under pressure in a well;

FIG. 4 diagrammatically shows a seismic installation for performing drilling noise monitoring operations, associated with another gas injection assembly;

DESCRIPTION OF THE PREFERRED EMBODIMENTS

Figure 5A:
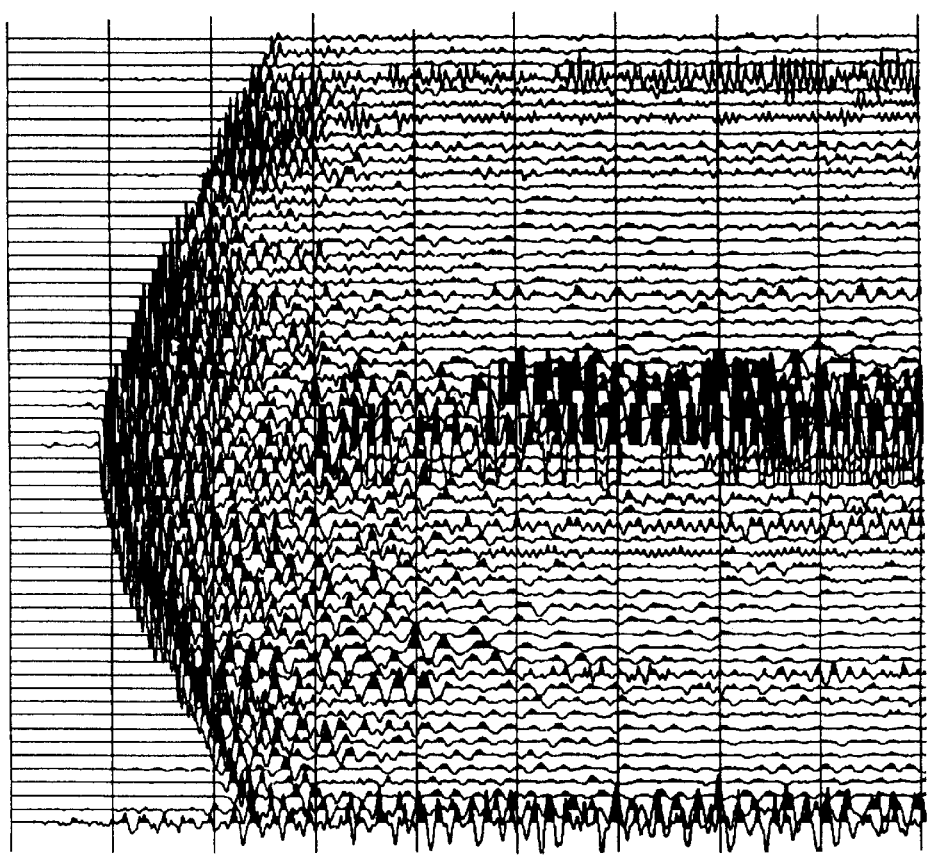
FIG. 5A shows an analog record example obtained by a VSP type seismic method in common collection source a strongly disturbed by the guided waves propagating along a well.

A seismic assembly for implementing a VSP type method for example includes as illustrated in FIG. 1 a source S of elastic waves coupled with the ground surface such as a vibrator, an explosive charge or an impact type impulsive source for example, and seismic pickups arranged in a well 1 crossing the subsurface formation to be explored. The pickups R are placed for example in a tool 2 lowered in the well at the end of an electric carrying cable 3 unwound by an operating set 4 arranged at the surface. The well tool 2 includes at least one sonde which may be anchored in the well through the opening of anchor arms, so as to couple at least one seismic pickup (triaxial geophones for example). The well tool may also include a main sonde 5 and at least one satellite sonde 6 arranged in a string below the main sonde, each one containing at least one seismic pickup.

A well tool suited for this VSP type of method is described for example in the following patents filed by the assignee: FR-A-2,656,034, FR-A-2,636,741 or FR-A-2,501,380.

It may be seen that the ground impulse generated by source S in the layers close to the surface is refracted at the level of the well and changed into waves referred to as "tube waves" propagating along the well and causing interference with useful wave arrivals propagating in the formation up to receivers R.

In order to implement a method referred to as reversed VSP method as illustrated in FIG. 2 a source of elastic waves such as an explosive charge, a vibrator or an impulsive source, anchored in the walls by anchor arms or an expansible anchor element such as a packer, is arranged in the well. Well sources suited for this application are described for example in the following patents filed by the assignee: FR-A-2,656,110 or FR-A-2,646,241 for example.

The seismic pickups are arranged in this case either at the surface or in another well.

The previous refraction phenomenon also occurs in this case. The waves created by the source are channelled along the well up to the layers close to the surface where they are converted into ground waves and picked up by receivers R at the surface.

The method according to the invention is implemented for example by means of tanks 7 containing selected constituents which, when brought together, react by generating a gas which is also not highly soluble in the fluid of the well, compressible enough to attenuate the tube waves propagating along the well and to prevent their conversion into ground waves.

According to a first embodiment, the constituents of the chemical reaction may be delivered separately through pipes 8 which are arranged along the well, at the chosen depth, 100 to 300 meters for example, down to a reaction chamber C. The chemical reaction is set off in situ.

According to another embodiment, the chemical reaction is set off at the surface and the gases under pressure produced by the chemical reaction are injected through a pipe 8 at the chosen injection depth. This pipe is provided with at least one opening at the end thereof or with several openings distributed along the length thereof.

According to another embodiment, suitable for carrying out reversed VSP (RVSP) operations, the gases absorbing the waves are produced in the well by means of an explosive chemical reaction. Charges capable of generating gases attenuating the tube waves are preferably used, for example nitromethane-based charges. This charge may be triggered prior to the seismic emissions or be used as a source of seismic waves.

Conventional explosives generate most often gases soluble in the drilling fluid, which condense suddenly and totally after the explosions. In a case when such conventional explosives are used, their action is preferably combined with an additional gas injection above the triggering point.

Attenuation of the tube waves may be obtained in a similar way within the scope of monitoring operations during drilling where the elastic waves created by a drill bit 9 are picked up by means of receivers R arranged at the surface or in another well, as described in patent application FR-92/15,986 filed by the applicant.

To that end, a tank 7 containing the not significantly soluble and compressible gas under pressure or a conventional compressor is connected to the circuits of the pumping installation 10 intended for injecting drilling mud inside drill string 11. The gases flowing up in the annular space between string 11 and well 1 up to the upper part thereof contribute here also towards attenuating the tube waves.

The lag time required by the gases in emulsion in the drilling fluid to reach the surface is often very long, much longer in any case than the time necessary for pulling the drill bit completely out of the well. It is therefore possible to perform successively:

drilling operations with gas injection in the drilling fluid as described previously;

complete withdrawal of the drill bit and clearing of the well;

lowering in the cleared hole of seismic a seismic device having a well source or seismic receivers suited to the type of method used (VSP or RVSP) or sonic sonde where both transmitted and receiver are arranged; and seismic prospecting operations benefiting from the absorption effect of the tube waves by the gases previously dispersed in the drilling fluid which continue to flow up along the well.

Figure 5B:
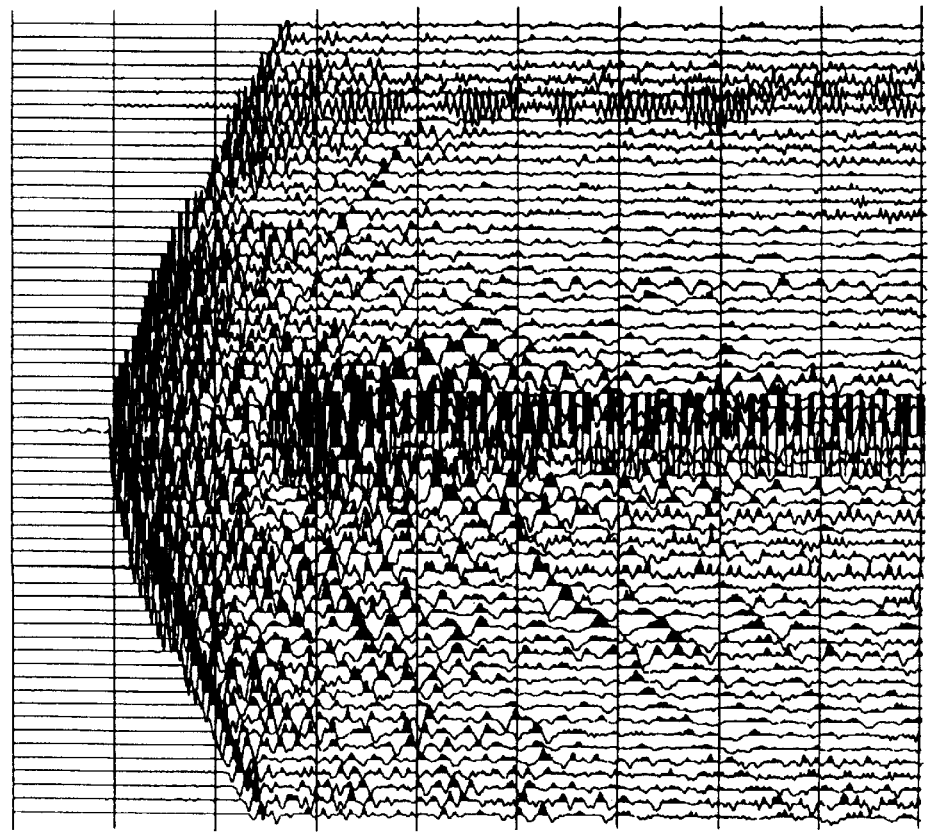
FIG. 5B shows another example of an analog record obtained after the dispersion of an absorbent gas at a certain depth in the same well.
Figure 6:
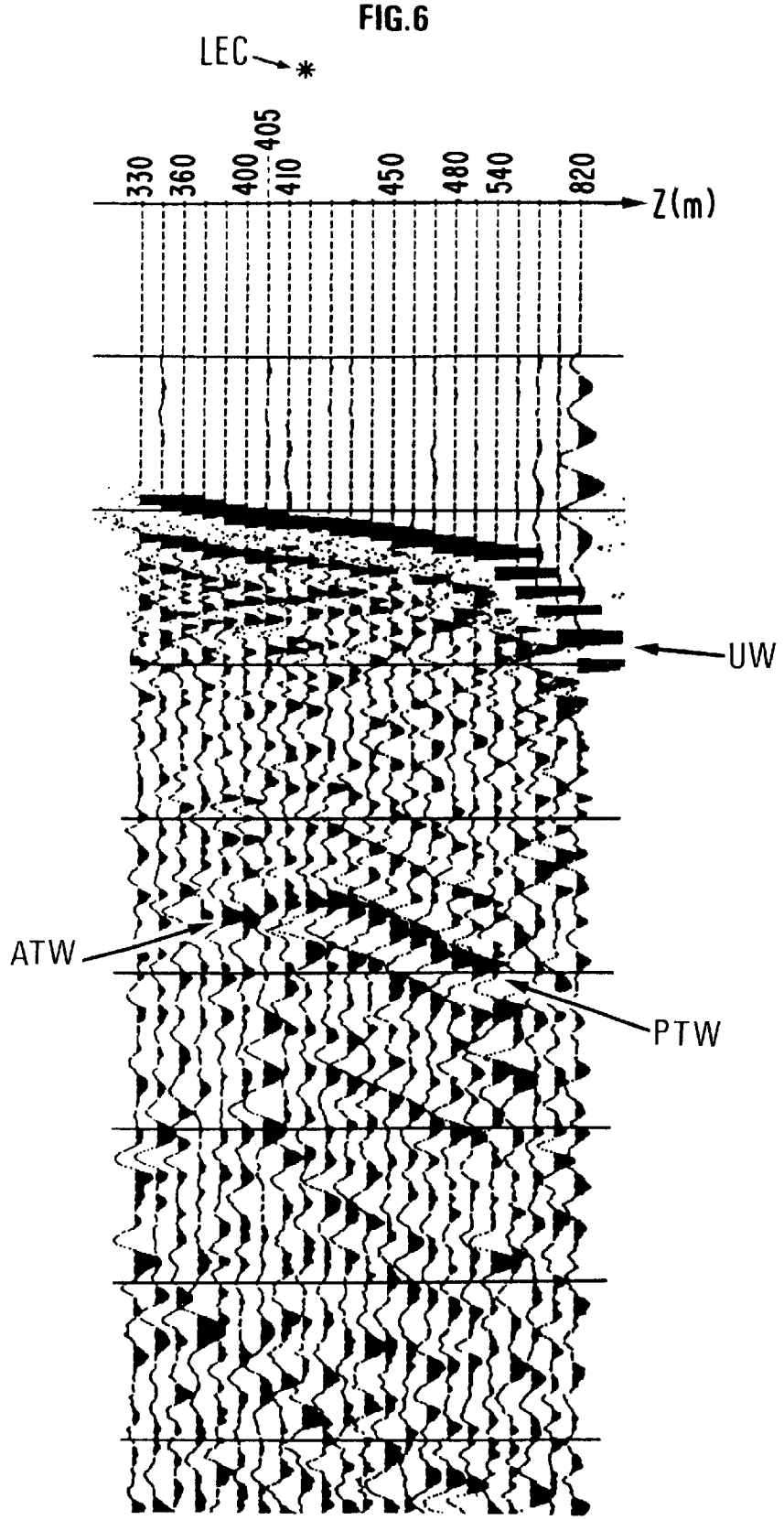
FIG. 6 shows another example of an analog record in a common pickup collection, obtained by using conventional explosive charges on the one hand, and a liquid explosive charge on the other hand, which clearly illustrates the filtering action which may be performed by gases insoluble in the fluid filling the well.

FIGS. 5A and 5 and FIG. 6 show examples of the attenuation effect of the tube waves, obtained through the diffusion of gas in the mud column of a well, in a RVSP type implementation by means of explosive charges triggered with an open hole.

The records of FIGS. 5A and 5B have been obtained respectively without gas injection and after injecting gas in the liquid column of the well. It may be seen that the alignments PW of FIG. 5A, which correspond to ground waves, are strongly attenuated in FIG. 5B.

FIG. 6 corresponds to analog records obtained by triggering explosive charges successively in a plurality of points at various depths (expressed in meters) of an open hole.

Shootings have been performed successively upwards, with conventional explosives producing fast-condensing gases when they are triggered. At a depth of 410 meters, a nitromethane-based liquid charge LEC has been triggered as described above. The tube waves PTW, visible when conventional charges are used, are considerable. The tube waves ATW are greatly attenuated for all the shots performed later, because of the presence of the insoluble gas dispersed in the upper part of the well after the explosion of the liquid charge which moves slowly up along the fluid column.

What is claimed is:

1. A method of attenuating tube waves produced during seismic exploration of a subsurface formation crossed by a well containing a drilling fluid in response to elastic waves applied to the subsurface formation with the tube waves propagating along the well and producing parasitic signals picked up by seismic receivers acoustically coupled to the subsurface formation comprising:

setting off an explosive source including nitromethane based charges in an upper part of the well in the drilling fluid which generates a gas within the drilling fluid which absorbs the tube waves which propagate within the drilling fluid; and performing seismic exploration of the subsurface formation, after the gas is generated, which produces the tube waves within the drilling fluid which are absorbed by the generated gas within the drilling fluid.

2. A device for seismic prospecting a subsurface formation crossed by a well containing a fluid comprising:

a source of elastic waves for applying elastic waves to the subsurface formation including the fluid within the well;

an explosive source including nitromethane based charges for positioning in an upper part of the well and for generating a gas upon detonation within the fluid which absorbs tube waves in the fluid produced in response to the elastic waves; and a plurality of receivers for acoustic coupling to the subsurface formation for picking up elastic waves which propagate through the subsurface formation to the receivers.

3. A method of attenuating tube waves produced during seismic exploration of a well containing a drilling fluid in response to elastic waves applied to a subsurface formation with the tube waves propagating along the well and producing parasitic signals picked up by at least one seismic receiver acoustically coupled to the subsurface formation comprising:

dispersing a gas in the drilling fluid;

circulating the drilling fluid containing the dispersed gas in the well to feed a bit of a drill string in the well; and performing seismic exploration of the subsurface formation, after the gas is dispersed in the drilling fluid and circulated in the well to feed the bit, which produces the tube waves within the drilling fluid which are absorbed by the dispersed gas within the drilling fluid.

4. A method in accordance with claim 3 wherein:

the elastic waves are emitted by the bit working at a bottom of the well; and the absorption of the tube waves is carried by the dispersed gas as the drilling fluid flows upward in an annular space between the well and the string.

5. A method in accordance with claim 3 wherein:

the elastic waves are produced by a source outside the drill string after the gas is dispersed in the drilling fluid and is pumped inside the well in an annular space between the well and the string.

6. A method in accordance with claim 3 wherein:

the elastic waves are produced after the bit has been removed from the well.

7. A method in accordance with claim 5 wherein:

the elastic waves are produced after the bit has been removed from the well.

8. A method in accordance with claim 3 wherein:

the performing of seismic explorations is performed by using at least one well sonde with each well sonde containing an emitter of the elastic waves and one seismic receiver.

9. A method in accordance with claim 4 wherein:

the elastic waves are produced after the bit has been removed from the well.

10. A method in accordance with claim 5 wherein:

the elastic waves are produced after the bit has been removed from the well.

11. A method in accordance with claim 6 wherein:

the elastic waves are produced after the bit has been removed from the well.

* * * * *